United States Patent
Haspel et al.

(10) Patent No.: US 7,052,063 B2
(45) Date of Patent: May 30, 2006

(54) FUNCTIONAL DEVICE FOR A MOTOR VEHICLE LOADING AREA

(75) Inventors: Klaus Haspel, Rottenburg (DE); Andreas Kobiela, Neckartenzlingen (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/889,556

(22) Filed: Jul. 12, 2004

(65) Prior Publication Data

US 2005/0012351 A1    Jan. 20, 2005

(30) Foreign Application Priority Data

Jul. 17, 2003    (DE) ................. 103 33 424

(51) Int. Cl.
*B60R 5/04*    (2006.01)
*B60R 21/06*    (2006.01)
(52) U.S. Cl. .................. 296/24.43; 296/37.16
(58) Field of Classification Search ......... 296/24.43, 296/24.4, 37.16
See application file for complete search history.

(56) References Cited

U.S. PATENT DOCUMENTS 5,224,748 A * 7/1993 Decker et al. ........... 296/37.16
5,685,592 A * 11/1997 Heinz .................... 296/37.16
2005/0012352 A1   1/2005 Sparrer et al.

FOREIGN PATENT DOCUMENTS

EP    0258823    * 3/1988 .............. 296/37.16
EP    1479564    11/2004

OTHER PUBLICATIONS

European Search Report dated Apr. 20, 2005 (3 pages).

* cited by examiner

*Primary Examiner*—Dennis H. Pedder

(74) *Attorney, Agent, or Firm*—Flynn, Thiel, Boutell & Tanis, P.C.

(57) ABSTRACT

1. Functional device for a motor vehicle luggage area.

Figure 1:
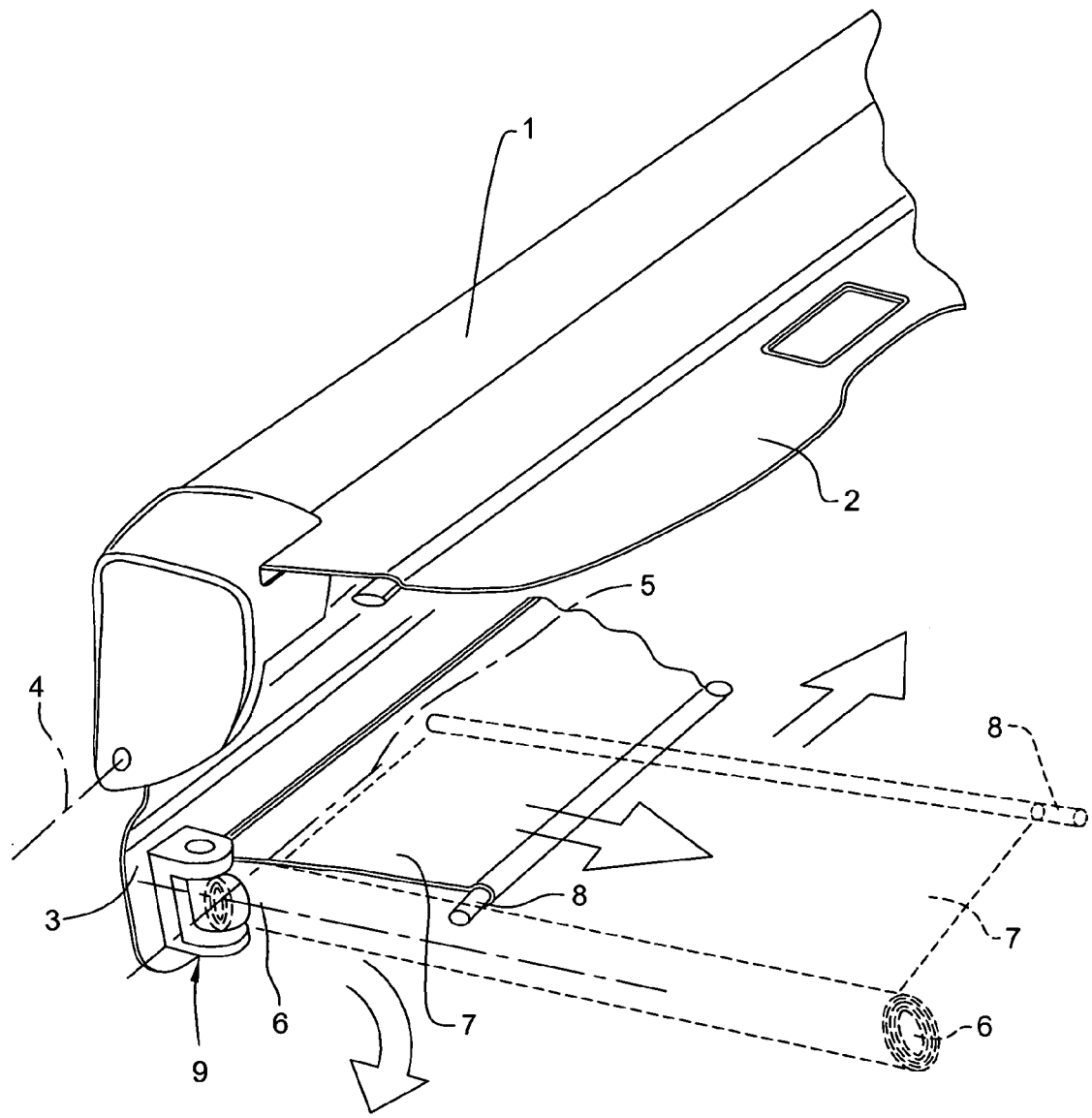

2.1 A functional device with a luggage area-side fixable casing unit in which at least one flexible flat article is movably mounted between a compactly deposited rest position and a horizontally extracted functional position is known.

2.2 According to the invention, spaced below the at least one flat article is provided at least one further flat article arrangement, which in a functional position is oriented in a plane parallel to a luggage area floor and which in a rest position is compactly deposited in the vicinity of the casing unit.

2.3 Use for station wagons and stretched limousines.

6 Claims, 3 Drawing Sheets

FUNCTIONAL DEVICE FOR A MOTOR VEHICLE LOADING AREA

The invention relates to a functional device for a loading area of a motor vehicle with a loading area-side fixable casing unit in which at least one flexible flat article is movably mounted between a compact, deposited rest position and a functional position drawn out at least approximately parallel to a luggage area floor. The following disclosure is based on German Patent Application No. 10333424.6 filed on Jul. 17, 2003, which is incorporated into this application by explicit reference.

Such a functional device is generally known for station wages in the form of a luggage area cover. The known luggage area cover has a casing unit in the form of a magazine casing, which is fixed detachably on the luggage area side in the vicinity of a rear seat back arrangement. The magazine casing contains in rotary mounted manner a winding shaft on which is held in upwardly and downwardly rollable manner a flexible flat article. The flexible flat article can be drawn out into a roughly horizontal functional position in which the luggage area of the station wagon can be covered roughly parallel to a luggage area floor.

The problem of the invention is to provide a functional device of the aforementioned type permitting an improved functional variability for the luggage area.

This problem is solved in that, spaced below a flat article, is provided at least one further flat article arrangement, which in a functional position is oriented in a plane parallel to the functional position of the at least one flat article and which in a rest position is compactly deposited in the vicinity of the casing unit.

The solution according to the invention makes it possible, in addition to the function of at least one flexible flat article, to create at least one further function due to the at least one additional flat article arrangement. It is in particular possible to create a partition or false bottom spaced below an upper luggage area cover through the additional flat article arrangement. As the additional flat article arrangement in the rest position is compactly deposited in the vicinity of the casing unit, it is possible to house the flat article arrangement in space-saving manner in such a way that the loading capacity of the luggage area is not impaired. The compact depositing of the additional flat article can either be brought about by a rolling up onto a winding shaft or by a compact sliding together of the flat article arrangement in the manner of a concertina fold. The flat article arrangement is preferably in the form of a flexible flat structure in the form of a textile web, which is designed so as to be unviewable or view-tight. It is also to additionally or alternatively make the flat article arrangement tear-resistant. In place of a view-tight flat article, it is also possible to provide a transparent separating net, whose tear resistance and anchorings to a functional position are such that the load or luggage from the luggage area floor is still reliably retained in the case of vehicle impact loads.

It is finally possible to provide as the flat article arrangement one or more dimensionally stable flat structures in the form of plates, frames with overspread netting or the like, which can partly or completely cover the luggage area surface.

In a development of the invention, the flat article arrangement has a flexible flat article held on a winding shaft. The winding shaft is preferably parallel to a winding shaft for the at least one flexible flat article.

According to a further development of the invention, the winding shaft is mounted in rotary manner parallel to a longitudinal extension of the casing unit on a casing portion more particularly integrally connected to the casing unit. The casing portion is connected to the casing unit either integrally or by fastening means. In the case of an integral connection the casing unit is preferably an extended part of the casing unit. It is also possible to design the casing portion as a separate casing firmly connected to the casing unit by suitable fastening means.

According to a further development of the invention, at a front end the winding shaft is pivotably mounted about a pivot axis extending in the vehicle height direction. This makes it possible to pivot the winding shaft at right angles to the winding shaft for the main flat article and in this way to transfer the additional flat article arrangement into its functional position at right angles to the drawing out or extraction direction of the main flat article. The flat article arrangement can be extracted into its functional position either in the winding shaft position pivoted at right angles to the other flat article or the flat article arrangement can be extracted into a functional position both in the parallel winding shaft orientation and in the winding shaft position which is at right angles. In this construction the flat article arrangement can be extracted both parallel to the main flat article extraction direction and at right angles to the main flat article extraction direction.

According to a further development of the invention, at least one guide profiling is provided on which is displaceably guided an extraction element arranged frontally on the flat article arrangement. This makes it possible to guide in a clearly defined manner, even during its extraction or roll-up movement the flat article arrangement. This in particular permits an automatic and consequently remotely controlled transfer of the flat article arrangement into the functional position or into the rest position.

According to a further development of the invention, the at least one guide profiling is movably arranged on the luggage area side between a rest position and a functional position. This makes it possible to space-savingly house in its rest position the at least one guide profiling when the flat article arranged is not in use. As soon as the flat article arrangement is to be transferred into its functional position, the guide profiling can be brought into the corresponding functional position. A movable arrangement can be created by a pivot bearing of the at least one guide profiling or by linear or curved guides of the guide profiling. Preferably there are two guide profilings, which flank the extraction element of the flat article arrangement on opposite sides for guiding the extraction element.

According to a further development of the invention, the casing portion is designed as a downwardly opening flap part, on whose inside is held the winding shaft. When not in use the casing portion is compactly located on the casing unit. Only on opening the flap part is it possible to grip the flat article arrangement and transfer it into its functional position.

According to a further development of the invention, a winding shaft mounting with a swivel joint is provided for tilting the winding shaft into a flat article extraction position. This permits a simple pivoting of the winding shaft between a position parallel to the main flat article winding shaft and the extraction position at right angles thereto.

Further advantages and features of the invention can be gathered from the following description of preferred embodiments of the invention, the claims and the attached drawings, wherein show:

FIG. 1 A perspective view of an embodiment of a functional device according to the invention for a car luggage area.

Figure 2:
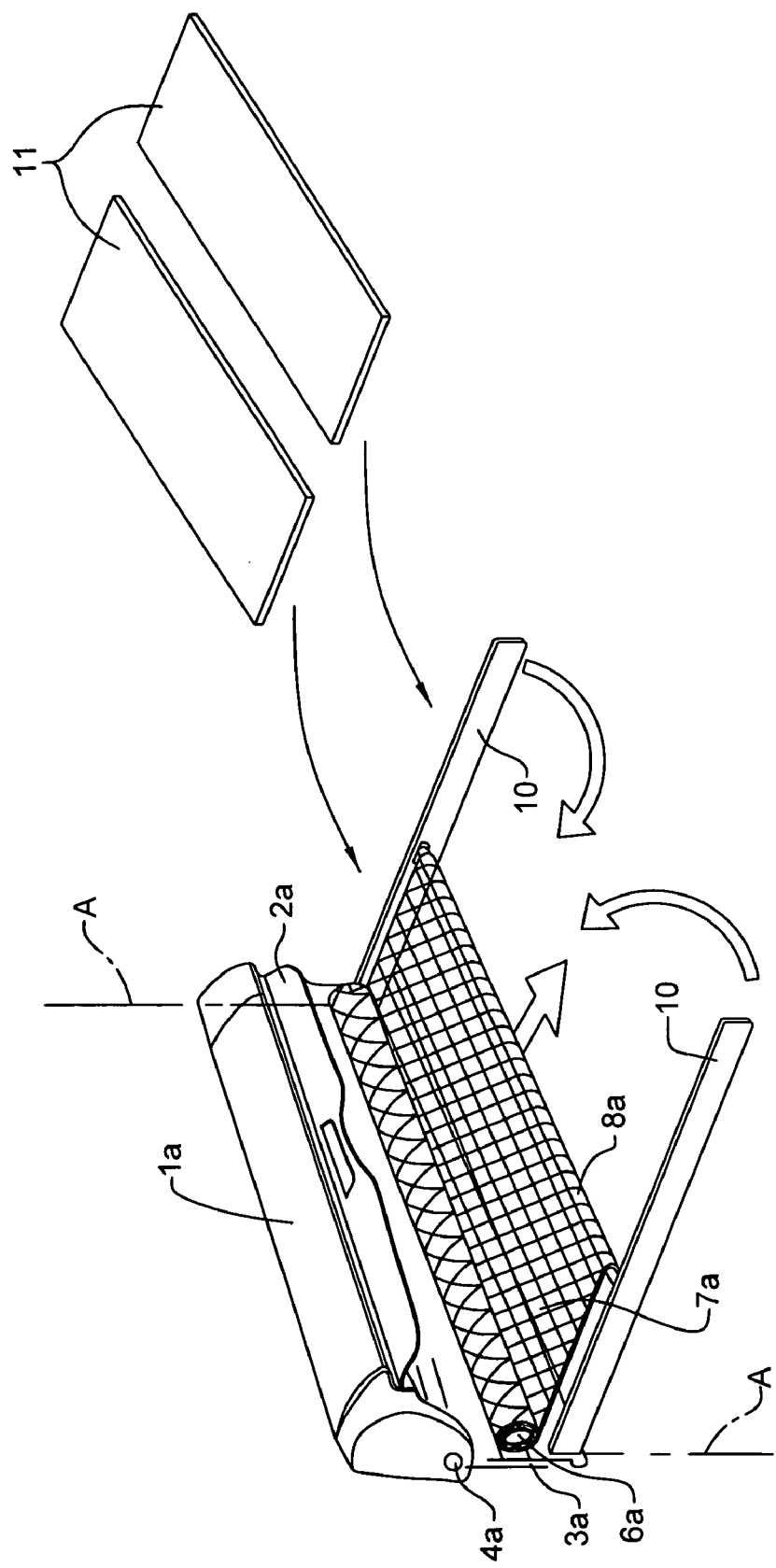

FIG. 2 A perspective view of another embodiment of a functional device according to the invention similar to FIG. 1.

Figure 3:
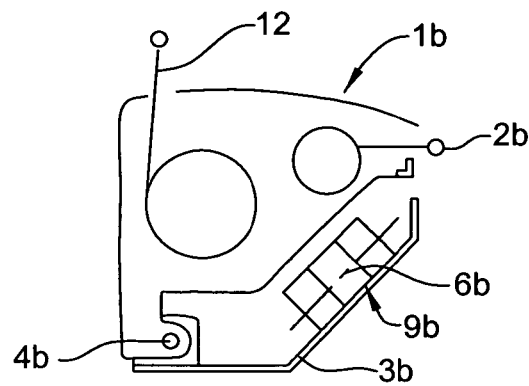

FIG. 3 A diagrammatic sectional view of the functional device according to FIG. 1 in the rest position.

Figure 4:
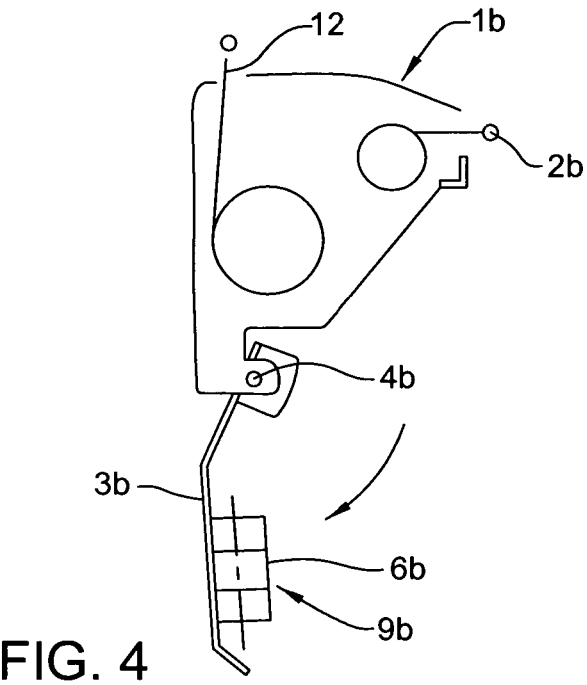

FIG. 4 The functional device according to FIG. 3 in a folded out functional position.

Figure 5:
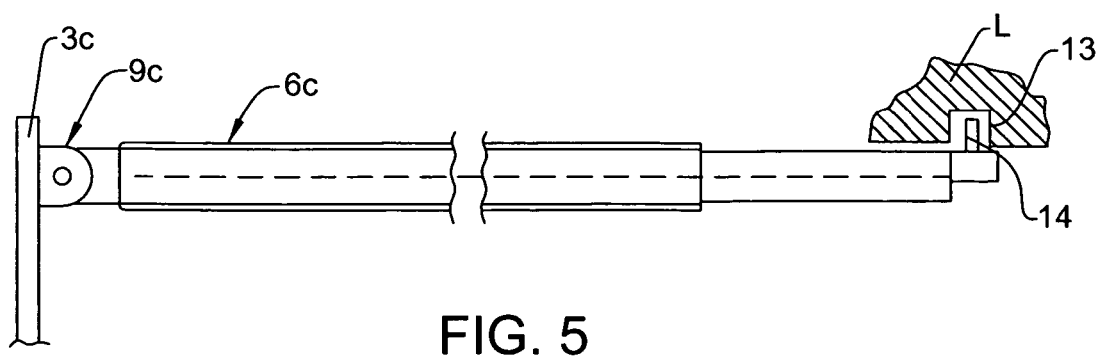

FIG. 5 A winding shaft for a functional device similar to FIGS. 1 to 4 in its swung out functional position.

A magazine casing 1 serving as a casing unit is positioned in luggage area-fixed manner in a car luggage area in the vicinity of a rear seat back arrangement in not shown, known manner. The cars in question are station wagons or stretched limousines. The magazine casing 1 contains a luggage area cover 2 in the form of a flexible flat article, which is mounted so as to wind up and down on a not shown winding shaft. The luggage area cover 2 is movably mounted between an integrated rest position wound into the magazine casing 1, except for a dimensionally stable contour part, and an extracted functional position. In the extracted functional position, the luggage area cover 2 is spread out roughly horizontally and roughly level with a vehicle edge in the luggage area in such a way that said luggage area is substantially completely covered. The luggage area cover 2 is designed in view-tight manner. With the aid of fastening elements in the vicinity of the dimensionally stable contour part, the luggage area cover 2 can be fixed in its roughly horizontal, extracted functional position in corresponding holders on the luggage area side.

In the embodiment according to FIG. 1, spaced below the luggage area cover 2 is provided a flat structure 7 serving as a flat article arrangement and which is also constructed flexibly from a textile web. The flat structure 7 is also mounted so as to be upwardly and downwardly windable on a winding shaft 6. The winding shaft 6 is mounted in rotary manner parallel to the winding shaft of the luggage area cover 2 with the rotation axis 5 oriented in the vehicle transverse direction on a flap-like casing part 3 of the magazine casing 1. On its front end in the extraction direction the flat structure 7 has an extraction ledge 8, which in the extracted functional position of the flat structure 7 can be detachably hung in between vehicle-side and/or luggage area-side holding receptacles, so that the flat structure 7 is secured in the luggage area in the extracted functional position.

The flap-like casing part 3 is pivotably mounted about a pivot axis 4, which is oriented parallel to the winding shaft of the luggage area cover 2, on the magazine casing 1 and as in the case of the embodiment according to FIGS. 3 and 4 between a closed position and an open position (shown in FIG. 1). With the casing part 3 are associated latching or locking means, which keep the casing part 3 fixed in the closed position on magazine casing 1 as in FIG. 3. Preferably the latching or locking means are manually releasable, so that by simply operating a corresponding operating member the flap-like casing part 3 opens and pivots downwards under its own weight. The winding shaft 6 is mounted in rotary manner as described on an inside of the flap-like casing part 3, which in the folded out open position of the casing part 3 is directed towards the rear of the luggage area.

In not shown manner, the flap-like casing part 3 is stopped in its open position according to FIG. 1 in the vicinity of the rear seat back arrangement. It is alternatively possible to lock the open position by corresponding blocking means in the vicinity of the pivot axis 4 relative to the magazine casing 1. In both cases the locking and position securing of the flap-like casing part 3 serve to bring about a retention against extraction forces, which during extraction of the flat structure 7 act on the latter and consequently the mounting of the winding shaft 6.

In addition to its rotary mobility about the rotation axis 5, in the vicinity of at least one front end the winding shaft 6 can be pivoted into the luggage area, preferably at right angles to the casing part 3, about a fold or tilt axis oriented in the vehicle height direction.

In the position shown in broken line form in FIG. 1, the flat structure 7 can also be extracted and in said extraction position the rotation direction of the winding shaft 6 is reversed. For the extraction direction of the flat structure 7 which is then in the vehicle transverse direction (see arrow), in not shown manner vehicle or luggage area-side holding receptacles are provided for the extracted functional position and permit a position securing of the flat structure 7 in the extracted functional position. In the case of the embodiment shown the swivel joint 9 is stably constructed and provided with a locking means in such a way that the winding shaft 6 remains in positionally secured manner in the functional position at right angles even during extraction movements of the flat structure 7. In addition, the swivel joint 9 is so stable that it carries the freely projecting winding shaft 6 in the manner of a swivel arm. The freely outwardly projecting front end of the winding shaft 6 is also latched out of a bearing unit in the vicinity of the casing part 3 and obviously, after pivoting back, can be latched in again and positionally secured there.

It is also possible in accordance with FIG. 5 to provide on the freely projecting front end of the winding shaft 6 a telescopically extractable fixing profile, on whose front end is provided a fastening element for the luggage area-side fixing in a luggage area-side fixing receptacle. Thus, the winding shaft is fixed both in the vicinity of the swivel joint 9 and in the vicinity of its opposite front end. In the embodiment shown in FIG. 5 the winding shaft is designated 6c. The not designated fastening profile is telescopically extractably integrated in the winding shaft 6c. As in the embodiment according to FIG. 1, the winding shaft 6c is held on a casing part 3c about a stable swivel joint 9c. For fixing the fastening profile to a side wall of the luggage area L, in said side wall is provided a fastening receptacle 13 in which engages a fastening element 14 arranged in correspondence to the fastening profile.

The essential difference in the case of the embodiment according to FIGS. 3 and 4 is that here the magazine casing 1b contains a further, vertically upwardly extractable flat article 12. The flat article 12 is provided as a separating netting for separating the luggage area from the car passenger compartment. Also in this embodiment on the rear of the magazine casing 1b facing the luggage area floor is provided a flap-like casing part 3b, which is mounted in tiltable manner about a pivot axis 4b between a closed position (FIG. 3) and an open position (FIG. 4). With the exception of the differences described hereinafter, the flap-like casing part 3b corresponds to the embodiment of FIG. 1, so that reference should be made to the description of the latter for further details. On an inside of the casing part 3b is mounted a winding shaft 6b for holding a flat structure extractable in accordance with FIG. 1. As in the embodiment of FIG. 1, the winding shaft 6b is pivotably mounted about a pivot axis oriented in the vehicle height direction in the vicinity of its one front end and for this purpose a swivel joint 9b is provided. The winding shaft 6b can in this way be pivoted roughly at right angles to the casing part 3b towards the rear of the luggage area, so that a not further represented flat structure held on the winding shaft can be extracted roughly horizontally at right angles to the extraction direction of the luggage area cover 2b. The swivel joint 9b can be constructed either identically to the one-arm solution according to FIG. 1 or with an additional support in the vicinity of the opposite front end according to FIG. 5.

In the embodiment according to FIG. 2 a magazine casing 1a with a luggage area cover 2a is provided corresponding to the construction according to FIG. 1. Therefore for further details reference should be made to the description of FIG. 1. Additionally in the vicinity of an underside of the magazine casing 1a is provided a flap-like casing part 3a which, as in the constructions of FIGS. 1, 3 and 4 is pivotably mounted on the magazine casing 1a about a pivot axis 4a oriented in the vehicle transverse direction. In the vicinity of its inside the casing part 3a also has a mounting support for a rotary winding shaft 6a, which is positioned parallel to a winding shaft for the luggage area cover 2a. Just below the winding shaft 6a are additionally provided on the casing part 3a two guide rails 10 serving as guide profilings and which are pivotably mounted between a rest position pivoted inwards on the plane of the casing part 3a and a guide position shown in FIG. 2, in each case about a pivot axis A oriented in the vehicle height direction. On their facing insides the guide rails 10 are provided with profile rails or similar profiling portions into which can be introduced front ends of an extraction ledge 8a of the flat structure 7a and which are linearly displaceable therein. Through the guide rails 10 it is possible to guide the extraction ledge 8a over all or at least most of the extraction path of the flat structure 7a between the wound up rest position and the extracted functional position in such a way that the extraction ledge 8a is at least substantially always oriented roughly parallel to a rotation axis of the winding shaft 6a. As soon as the flat structure 7a has returned to the wound-up rest position thereof, the corresponding front ends of the extraction ledge 8a are disengaged from the guide rails 10, so that the latter can be tilted inwards into their rest position engaging on the casing part 3a. The casing part 3a is curved in such a way that it is pivoted upwards in its closed position together with the folded in guide rails 10 and can be fixed in said closed position without the guide rails 10 impeding the closing or fixing movement.

Alternatively or additionally the guide rails 10 are constructed in such a way that between the facing guide rails 10 parallel to one another in the folded out functional position can be inserted a flat article arrangement in the form of one or more dimensionally stable plates 11. The latter can define a false bottom above the actual luggage area floor. If necessary, the plates 11 can be removed again.

The invention claimed is:

1. Functional device for a motor vehicle luggage area with a luggage area-side fixable casing unit in which at least one flexible flat structure is movably mounted between a compactly deposited rest position and a functional position extracted at least approximately parallel to a luggage area floor, wherein, spaced below the at least one flat structure is provided at least one further flat article arrangement, which in a functional position is oriented in a plane parallel to the functional position of the at least one flat structure and which is compactly deposited in the vicinity of the casing unit in a rest position,
   wherein the flat article arrangement has a flexible flat structure held on a winding shaft,
   wherein the winding shaft is rotatably mounted on a casing portion, more particularly integrally connected to the casing unit, parallel to a longitudinal extension of the casing unit, and
   wherein one front end of the winding shaft is pivotably mounted about a pivot axis extending in the vehicle height direction.

2. Functional device for a motor vehicle luggage area with a luggage area-side fixable casing unit in which at least one flexible flat structure is movably mounted between a compactly deposited rest position and a functional position extracted at least approximately parallel to a luggage area floor, wherein, spaced below the at least one flat structure is provided at least one further flat article arrangement, which in a functional position is oriented in a plane parallel to the functional position of the at least one flat structure and which is compactly deposited in the vicinity of the casing unit in a rest position,
   wherein at least one guide profiling is provided on which is displaceably guided an extraction element frontally arranged on the flat article arrangement, and
   wherein the guide profiling is movably arranged on the luggage area side between a rest position and a functional position.

3. Functional device according to claim 2, wherein the guide profiling is pivotably located on the casing unit.

4. Functional device according to claim 3, wherein two guide profilings are provided, which in their guide position flank on opposite sides the flat article arrangement.

5. Functional device for a motor vehicle luggage area with a luggage area-side fixable casing unit in which at least one flexible flat structure is movably mounted between a compactly deposited rest position and a functional position extracted at least approximately parallel to a luggage area floor, wherein, spaced below the at least one flat structure is provided at least one further flat article arrangement, which in a functional position is oriented in a plane parallel to the functional position of the at least one flat structure and which is compactly deposited in the vicinity of the casing unit in a rest position,
   wherein the flat article arrangement has a flexible flat structure held on a winding shaft,
   wherein the winding shaft is rotatably mounted on a casing portion, more particularly integrally connected to the casing unit, parallel to a longitudinal extension of the casing unit,
   wherein the casing portion is part of the casing unit, and
   wherein the casing portion is designed as a downwardly opening flap part on whose inside is held the winding shaft.

6. Functional device according to claim 1, wherein there is a winding shaft mounting support with a swivel joint for folding out the winding shaft in an extraction position of the flat article arrangement.

* * * * *